US012706473B2

(12) United States Patent
Suzuki et al.

(10) Patent No.: US 12,706,473 B2
(45) Date of Patent: Aug. 11, 2026

(54) CHARGER CONTROL APPARATUS, CHARGER CONTROL METHOD, AND NON-TRANSITORY COMPUTER-READABLE MEDIUM

(71) Applicant: NEC Corporation, Tokyo (JP)

(72) Inventors: Hiromi Suzuki, Tokyo (JP); Yasuhiro Sasaki, Tokyo (JP); Hideyuki Ishiuji, Tokyo (JP); Satoshi Tanaka, Tokyo (JP); Miho Kubota, Tokyo (JP); Yoshihiko Yonehara, Tokyo (JP); Yutaka Okano, Tokyo (JP); Sayaka Ishimoto, Tokyo (JP); Noriyuki Nakayama, Tokyo (JP); Keiko Yamaguchi, Tokyo (JP); Yusuke Shinozaki, Tokyo (JP); Shota Ito, Tokyo (JP); Takashi Kuroha, Tokyo (JP); Asuka Matsuba, Tokyo (JP); Megumi Eto, Tokyo (JP); Yuuki Tanaka, Tokyo (JP); Yoshikazu Kawashima, Tokyo (JP); Tsutomu Oono, Tokyo (JP); Nariyoshi Kotake, Tokyo (JP); Kuniyoshi Nakada, Tokyo (JP); Katsuhiko Ishida, Tokyo (JP); Koji Kitahara, Tokyo (JP); Akira Miyahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 728 days.

(21) Appl. No.: 18/128,712

(22) Filed: Mar. 30, 2023

(65) Prior Publication Data

US 2023/0327470 A1 Oct. 12, 2023

(30) Foreign Application Priority Data

Apr. 11, 2022 (JP) ................................ 2022-065165

(51) Int. Cl.
*H02J 7/94* (2026.01)
*B60L 53/67* (2019.01)
(Continued)

(52) U.S. Cl.
CPC ................ *H02J 7/94* (2026.01); *B60L 53/67* (2019.02); *H02J 7/40* (2026.01); *H02J 7/52* (2026.01)

(58) Field of Classification Search
CPC ....... H02J 7/94; H02J 7/40; H02J 7/52; B60L 53/67
(Continued)

(56) References Cited

U.S. PATENT DOCUMENTS

2011/0199048 A1 8/2011 Yokoyama et al.
2024/0266846 A1* 8/2024 Shao ......................... H02J 7/34
2025/0266693 A1* 8/2025 Bijlenga ............... H02J 7/0016

FOREIGN PATENT DOCUMENTS

JP H08-116626 A 5/1996
JP H08-318023 A 12/1996
(Continued)

OTHER PUBLICATIONS

Machine Translation of JP2013-070500, 97 pages (Year: 2013).*
(Continued)

*Primary Examiner* — Nathaniel R Pelton

(57) ABSTRACT

A charger control apparatus includes a total current acquisition unit and a setting unit to control a plurality of chargers connected in parallel with each other and supplied with a current from a common wiring line. An upper limit value of a current flowing through the wiring line is described as a first upper limit value. The total current acquisition unit acquires a total value of a current flowing through the plurality of chargers. The setting unit sets, for each of the plurality of chargers, a second upper limit value being an
(Continued)

upper limit value of a current flowing through the charger by using the first upper limit value. When a difference between the total value and the first upper limit value satisfies a reference, the setting unit updates the second upper limit value for each of the plurality of chargers by distributing the difference according to a first rule.

10 Claims, 9 Drawing Sheets

(51) Int. Cl.
*H02J 7/40* (2026.01)
*H02J 7/52* (2026.01)

(58) Field of Classification Search
USPC .......................................................... 320/162
See application file for complete search history.

(56) References Cited

FOREIGN PATENT DOCUMENTS

| | | | |
|---|---|---|---|
| JP | 2011-172327 A | | 9/2011 |
| JP | 2013-066372 A | | 4/2013 |
| JP | 2013-070500 | * | 4/2013 |
| JP | 2013-070500 A | | 4/2013 |
| JP | 2013-225971 A | | 10/2013 |
| JP | 2014-192947 A | | 10/2014 |
| JP | 2015-037346 A | | 2/2015 |
| JP | 2015-133869 A | | 7/2015 |
| JP | 2018-191478 A | | 11/2018 |

OTHER PUBLICATIONS

JP Office Action for JP Application No. 2022-065165, mailed on Dec. 5, 2023 with English Translation.
JP Office Action for JP Application No. 2022-065165, mailed on Jun. 27, 2023 with English Translation.

* cited by examiner

FIG. 6

| | SECOND UPPER LIMIT VALUE BEFORE UPDATE | ACTUAL VALUE OF CURRENT | SECOND UPPER LIMIT VALUE AFTER UPDATE |
|---|---|---|---|
| FIRST CHARGER | 10 | 10 | 13 |
| SECOND CHARGER | 10 | 4 | 4 |
| THIRD CHARGER | 10 | 10 | 13 |

CHARGER CONTROL APPARATUS, CHARGER CONTROL METHOD, AND NON-TRANSITORY COMPUTER-READABLE MEDIUM

This application is based on Japanese patent application No. 2022-065165, the content of which is incorporated hereinto by reference.

BACKGROUND

Technical Field

The present invention relates to a charger control apparatus, a charger control method, and a non-transitory computer-readable medium.

Related Art

In recent years, an improvement of a charging apparatus that charges a secondary battery and the like included in an electric vehicle has been considered. For example, Japanese Patent Application Publication No. 2015-133869 discloses a charging system performing the following processing. First, a charging control unit decides distribution power to be distributed to each charging apparatus in such a way that a total of the distribution power does not exceed power being determined under a supply and demand contract. Then, when a difference between a current value based on the distribution power and an actual current value is greater than a predetermined difference, the charging control unit corrects, to "actual current value+predetermined difference", a present charging current value instructed to the charging apparatus. Then, the charging control unit distributes an excess generated by the correction to another charging apparatus.

Further, Japanese Patent Application Publication No. 2014-192947 describes that the following processing is performed when a plurality of vehicles are charged. First, a charging current distribution unit distributes a charging current in such a way that a total value of the charging current does not exceed a preset maximum current value (contract current value), and discontinues charging as necessary. For example, it is described that, when the number of vehicles to be charged exceeds a preset threshold value, charging to a vehicle having low priority is discontinued. Further, it is also described that a vehicle having high priority is charged with a maximum charging current only for a predetermined period of time from a charging start, and then the charging current is distributed equally to the vehicle and a vehicle having low priority.

SUMMARY

In Japanese Patent Application Publication No. 2015-133869, when a difference between a current value based on distribution power and an actual current value is greater than a predetermined difference, the distribution power is corrected. Further, Japanese Patent Application Publication No. 2014-192947 uses priority of a vehicle for discontinuing charging. However, in these methods, there may be conceivably a case where efficiency of charging decreases. Thus, the present inventor has considered efficiently charging a plurality of secondary batteries by a method different from the methods.

One example of an object of the present invention is, in view of the problem described above, to provide a charger control apparatus, a charger control method, and a program that are capable of efficiently charging a plurality of secondary batteries.

In one example embodiment, there is provided a charger control apparatus including:

- a total current acquisition unit that acquires a total value of a current flowing through a plurality of chargers connected in parallel with each other; and
- a setting unit that sets, for each of the plurality of chargers, a second upper limit value being an upper limit value of a current flowing through the charger by using a first upper limit value being an upper limit value of a current being set with respect to a wiring line that supplies a current to the plurality of chargers, in which
- the setting unit updates a plurality of the second upper limit values by distributing a difference between the total value and the first upper limit value to the plurality of chargers according to a first rule when the difference between the total value and the first upper limit value satisfies a reference.

In another example embodiment, there is provided a charger control method including, by a computer:

- acquiring a total value of a current flowing through a plurality of chargers connected in parallel with each other;
- setting, for each of the plurality of chargers, a second upper limit value being an upper limit value of a current flowing through the charger by using a first upper limit value being an upper limit value of a current being set with respect to a wiring line that supplies a current to the plurality of chargers; and
- updating a plurality of the second upper limit values by distributing a difference between the total value and the first upper limit value to the plurality of chargers according to a first rule when the difference between the total value and the first upper limit value satisfies a reference.

In still another example embodiment, there is provided a non-transitory computer-readable medium storing a program for causing a computer to include:

- a total current acquisition function of acquiring a total value of a current flowing through a plurality of chargers connected in parallel with each other; and
- a setting function of setting, for each of the plurality of chargers, a second upper limit value being an upper limit value of a current flowing through the charger by using a first upper limit value being an upper limit value of a current being set with respect to a wiring line that supplies a current to the plurality of chargers, in which
- the setting function updates a plurality of the second upper limit values by distributing a difference between the total value and the first upper limit value to the plurality of chargers according to a first rule when the difference between the total value and the first upper limit value satisfies a reference.

One aspect of the present invention is able to provide a charger control apparatus, a charger control method, and a program that are capable of efficiently charging a plurality of secondary batteries.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 6 is a diagram for describing processing performed in step S40 in FIG. 5;

DETAILED DESCRIPTION OF EXAMPLE EMBODIMENTS

The invention will be now described herein with reference to illustrative example embodiments. Those skilled in the art will recognize that many alternative example embodiments can be accomplished using the teachings of the present invention and that the invention is not limited to the example embodiments illustrated for explanatory purposes.

Hereinafter, example embodiments of the present invention will be described with reference to the drawings. Note that, in all of the drawings, a similar component has a similar reference sign, and description thereof will be appropriately omitted.

Figure 1:
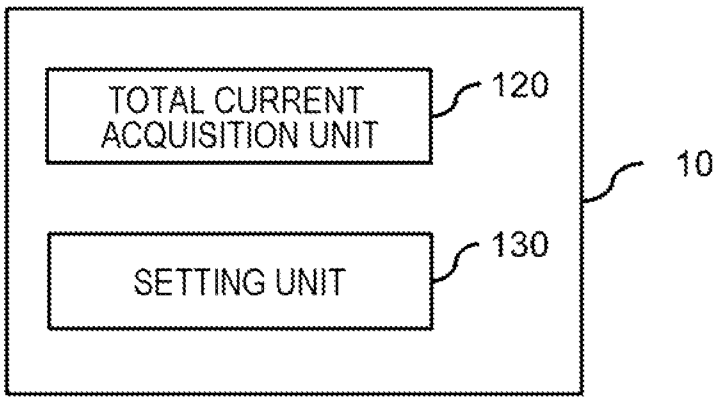
FIG. 1 is a diagram illustrating an outline of a charger control apparatus according to an example embodiment.

FIG. 1 is a diagram illustrating an outline of a charger control apparatus according to an example embodiment. The charger control apparatus 10 is a device that controls a plurality of chargers, and includes a total current acquisition unit 120 and a setting unit 130. The plurality of chargers are connected in parallel with each other and are supplied with a current from a common wiring line. An upper limit value of the current is set with respect to the wiring line. Hereinafter, the upper limit value is described as a first upper limit value.

The total current acquisition unit 120 acquires a total value of the current flowing through the plurality of chargers. The setting unit 130 sets, for each of the plurality of chargers, a second upper limit value being an upper limit value of the current flowing through the charger by using the first upper limit value described above. Then, when the total value acquired by the total current acquisition unit 120 falls below the first upper limit value described above and a difference thereof satisfies a reference, the setting unit 130 updates the second upper limit value for each of the plurality of chargers by distributing the difference between the total value and the first upper limit value to the plurality of chargers according to a first rule. Note that, the reference applied to the difference described above is that a reference value is exceeded, for example. The reference value may be 0.

When the charger control apparatus 10 is used, the second upper limit value can be set for each of the plurality of chargers. Normally, the second upper limit value is often smaller than an upper limit value of a current that can be permitted by a secondary battery during charging. Meanwhile, as charging of the secondary battery proceeds, the upper limit value of the current that can be permitted by the secondary battery becomes smaller. Thus, when charging of the secondary battery comes down to the end, the upper limit value of the current that can be permitted by the secondary battery becomes smaller than the second upper limit value being set with respect to a charger (hereinafter, the charger will be described as a target charger) that charges the secondary battery. In this case, a part of the limit (i.e., the second upper limit value) of the current assigned to the target charger becomes useless.

Meanwhile, in the state described above, a difference between the total value acquired by the total current acquisition unit 120 and the first upper limit value described above gradually increases. Thus, when the total value acquired by the total current acquisition unit 120 falls below the first upper limit value described above and a difference thereof satisfies the reference, the setting unit 130 updates the second upper limit value for each of the plurality of chargers by distributing the difference between the total value and the first upper limit value to the plurality of chargers according to the first rule. In this way, a part of the limit of the current assigned to the target charger can be substantially assigned to the other charger. Therefore, when the charger control apparatus 10 is used, a plurality of secondary batteries can be efficiently charged.

Hereinafter, a detailed example of the charger control apparatus 10 will be described.

Figure 2:
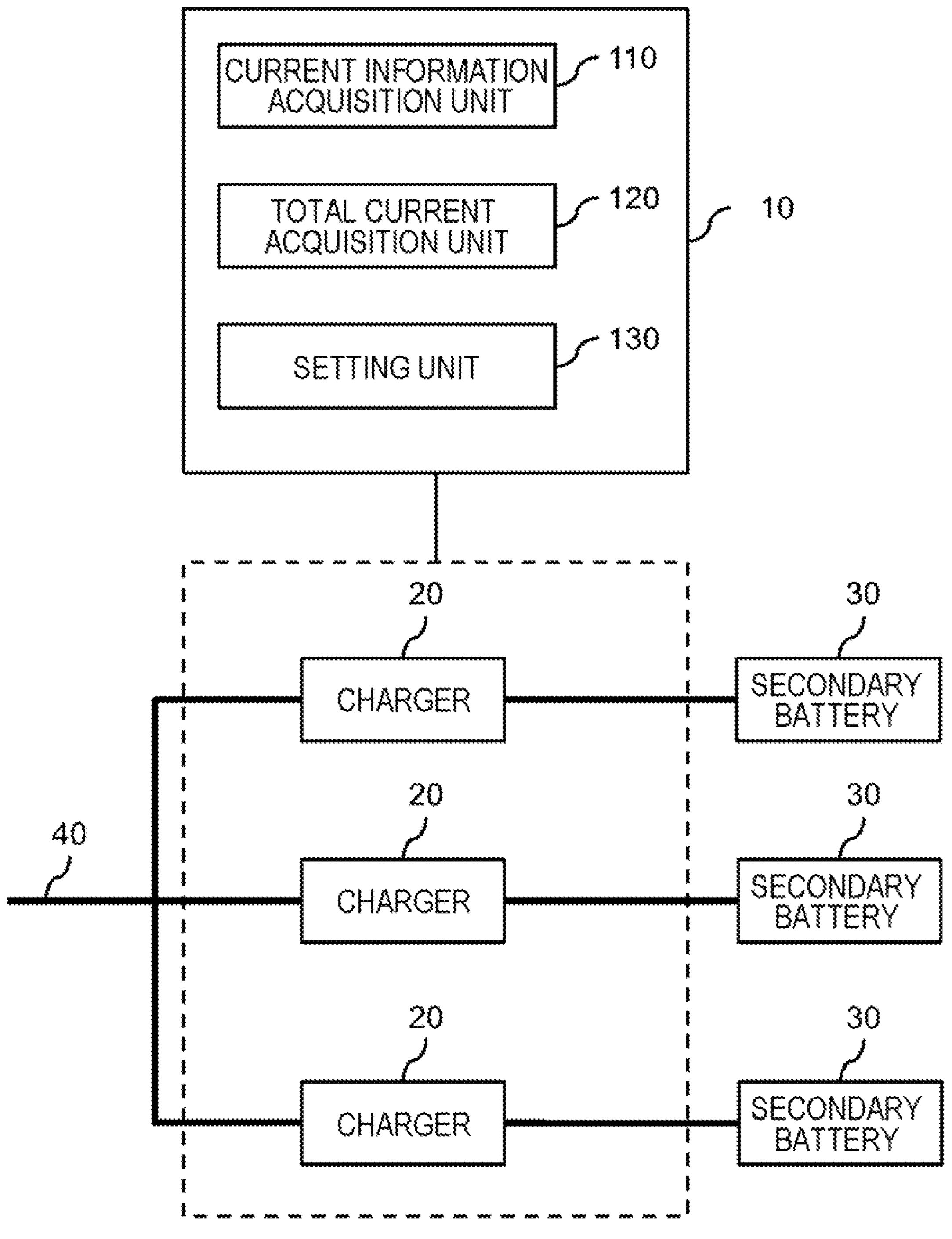
FIG. 2 is a diagram illustrating a detailed example of a configuration of the charger control apparatus together with a usage environment of the charger control apparatus.

FIG. 2 is a diagram illustrating a detailed example of a configuration of the charger control apparatus 10 together with a usage environment of the charger control apparatus 10.

First, the usage environment of the charger control apparatus 10 will be described. The charger control apparatus 10 controls a plurality of chargers 20. The plurality of chargers 20 are connected in parallel with each other. Specifically, the plurality of chargers 20 charge secondary batteries 30 different from each other. The secondary battery 30 is a battery mounted on an electric vehicle, for example. The battery is a power source of the electric vehicle. Then, the secondary battery 30 is connected to the charger 20 in a state of being mounted on the electric vehicle. However, the secondary battery 30 may be connected to the charger 20 after the secondary battery 30 is taken out from the electric vehicle. Note that, one example of the electric vehicle is a car that travels on a road.

The plurality of chargers 20 are provided in a charging facility. However, at least one of the chargers 20 may be mounted on equipment using the secondary battery 30, for example, an electric vehicle. Further, the plurality of chargers 20 have the same configuration. However, at least one of the chargers 20 may have a configuration different from that of the other charger 20.

The charger 20 can measure a current value flowing through the charger 20. Then, the charger 20 transmits information indicating the current value, i.e., current information together with identification information about the charger 20 to the charger control apparatus 10.

A wiring line 40 is located upstream of the chargers 20. Then, a current flowing through the wiring line 40 is distributed to the plurality of chargers 20. A target object to which the wiring line 40 supplies power is preferably only the plurality of chargers 20.

Then, the charger control apparatus 10 controls a charging condition of the plurality of chargers 20. For example, the charger control apparatus 10 sets, for each of the plurality of chargers 20, a second upper limit value being an upper limit value of the current flowing through the charger 20. The second upper limit value is, for example, a current value in a constant current mode. In setting the second upper limit value, the charger control apparatus 10 uses the current information acquired from the charger 20. Note that, when a control apparatus that controls a charging condition, for example, a current value in a constant current mode is mounted on equipment (for example, an electric vehicle) using the secondary battery 30, the charger control apparatus 10 may set the second upper limit value described above in the control apparatus.

Note that, the charger control apparatus 10 stores a first upper limit value indicating an upper limit value of the current flowing through the wiring line 40. The first upper limit value is determined based on standards of an electric wire used as the wiring line 40, for example. For example, the first upper limit value is set by multiplying an upper limit value of a current indicated by standards by a predetermined coefficient equal to or less than one. The predetermined coefficient is, for example, equal to or more than 0.8 and equal to or less than 0.95, but is not limited thereto.

Next, the configuration of the charger control apparatus 10 will be described. The charger control apparatus 10 includes a current information acquisition unit 110, the total current acquisition unit 120, and the setting unit 130.

The current information acquisition unit 110 acquires, for each of the plurality of chargers 20, current information about the charger 20. Specifically, the current information acquisition unit 110 acquires, from each of the plurality of chargers 20, identification information and current information about the charger 20. The current information acquisition unit 110 repeatedly, for example, regularly acquires the pieces of information. The acquisition interval is, for example, equal to or longer than one minute and equal to or shorter than 10 minutes, but may fall outside the range.

The total current acquisition unit 120 acquires a total value of a current flowing through the plurality of chargers 20. For example, the total current acquisition unit 120 computes the total value described above by adding up current values indicated by the plurality of pieces of current information acquired by the current information acquisition unit 110.

The setting unit 130 sets a second upper limit value for each of the plurality of chargers 20. As described above, the second upper limit value is, for example, a current value in a constant current mode.

Then, the total current acquisition unit 120 and the setting unit 130 repeatedly perform the processing, and update the second upper limit value as necessary. For example, the total current acquisition unit 120 computes the total value described above every time the current information acquisition unit 110 acquires, from each of the plurality of chargers 20, identification information and current information about the charger 20. Then, the setting unit 130 updates the second upper limit value every time the total current acquisition unit 120 computes the total value. Note that, the update also includes maintenance of the status quo.

For example, when the total value acquired by the total current acquisition unit 120 falls below the first upper limit value described above and a difference thereof satisfies a reference, the setting unit 130 updates the second upper limit value for each of the plurality of chargers by distributing the difference between the total value and the first upper limit value to the plurality of chargers according to a first rule. Note that, the reference applied to the difference described above is that a reference value is exceeded, for example. The reference value may be 0.

One example of the first rule is equal distribution. In this way, the same charging current flows through the plurality of secondary batteries 30. Thus, a difference in charging amount per unit time among the plurality of secondary batteries 30 is reduced. In other words, the plurality of secondary batteries 30 can be fairly charged. However, the first rule is not limited to equal distribution. For example, when a user of the secondary battery 30 is a specific person, for example, a person who is registered as a member, the setting unit 130 may set a greater current value distributed to the charger 20 used by the person than a current value distributed to the other charger 20.

Further, when there is the charger 20, i.e., the target charger in which a value indicated by current information is smaller than the second upper limit value and a difference thereof satisfies a reference, the setting unit 130 reduces the second upper limit value of the target charger, and also increases the second upper limit value of the other charger 20 by distributing the difference between the second upper limit value of the target charger before and after the update to the other charger 20 according to a second rule. Note that, the reference applied to the difference described above is that a reference value is exceeded, for example. The reference value may be 0.

One example of the second rule is equal distribution. In this way, the same charging current flows through the plurality of secondary batteries 30 after the distribution. Thus, the plurality of secondary batteries 30 can also be fairly charged after the distribution. However, the second rule is not limited to equal distribution. For example, when a user of the secondary battery 30 is a specific person, for example, a person who is registered as a member, the setting unit 130 may set a greater current value distributed to the charger 20 used by the person than a current value distributed to the other charger 20.

Note that, when at least one available charger starts operation in a state where some of the chargers 20 operate, i.e., a state where there is an available charger 20, the setting unit 130 may perform the processing. The reason is that a current needs to be distributed to the charger 20 that newly operates. For example, the setting unit 130 may set the second upper limit value by distributing the first upper limit value set with respect to the wiring line 40 to the chargers 20 (including the charger 20 that newly operates) in operation according to a third rule. Subsequently, the current information acquisition unit 110, the total current acquisition unit 120, and the setting unit 130 perform the processing described above.

One example of the third rule is equal distribution. However, the third rule is not limited to equal distribution. For example, when a user of the secondary battery 30 is a specific person, for example, a person who is registered as a member, the setting unit 130 may set a greater current value distributed to the charger 20 used by the person than a current value distributed to the other charger 20.

In the example described above, the plurality of chargers 20 are handled as an apparatus different from the charger control apparatus 10. However, the plurality of chargers 20 may be handled as a part of the charger control apparatus 10.

Note that, the setting unit 130 may output, for each of the plurality of chargers 20, the second upper limit value set with respect to the charger 20. The output may be performed on a terminal operated by a manager of the plurality of chargers 20, for example. In this case, the terminal displays the second upper limit value for each of the plurality of chargers 20 on a display. Further, the setting unit 130 may output, to a terminal operated by an owner of the secondary battery 30, the second upper limit value set with respect to the charger 20 connected to the secondary battery 30. Further, the setting unit 130 may display, on a display included in each of the plurality of chargers 20, the second upper limit value set with respect to the charger 20 connected to the secondary battery 30. Note that, the setting unit 130 may regularly perform the output described above, or may perform the output described above every time the second upper limit value is updated.

Figure 3:
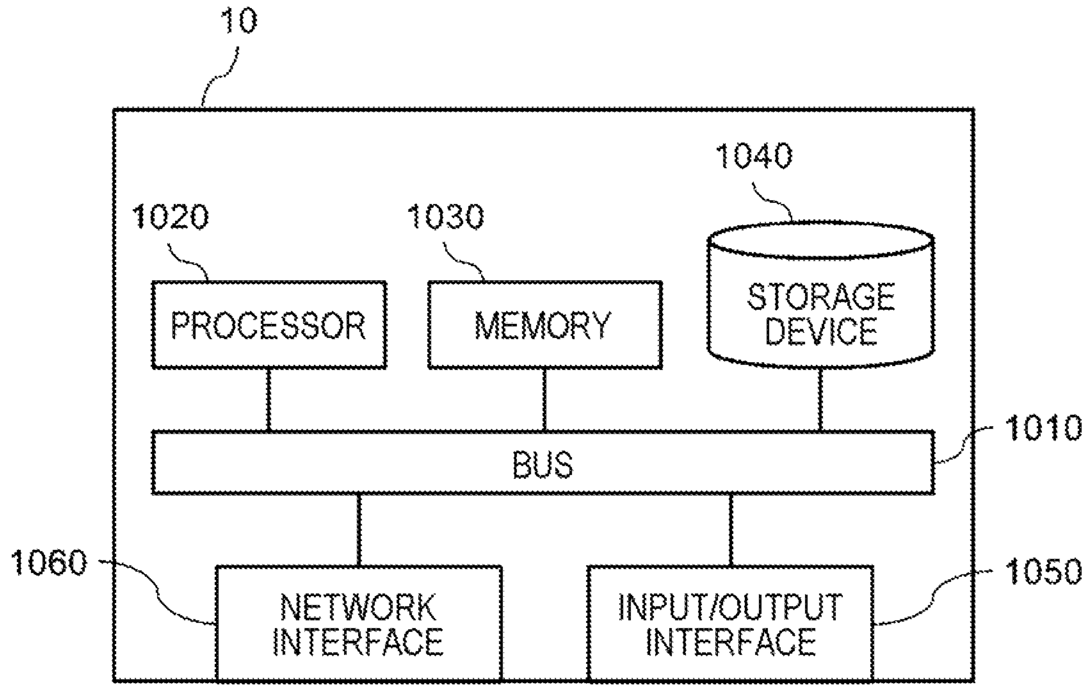
FIG. 3 is a diagram illustrating a hardware configuration example of the charger control apparatus.

FIG. 3 is a diagram illustrating a hardware configuration example of the charger control apparatus 10. The charger control apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method for connecting the processor 1020 and the like to one another is not limited to bus connection.

The processor 1020 is a processor achieved by a central processing unit (CPU), a graphics processing unit (GPU), and the like.

The memory 1030 is a main storage achieved by a random access memory (RAM) and the like.

The storage device 1040 is an auxiliary storage achieved by a hard disk drive (HDD), a solid state drive (SSD), a removable medium such as a memory card, a read only memory (ROM), or the like, and includes a storage medium. The storage medium of the storage device 1040 stores a program module that achieves each function (for example, the current information acquisition unit 110, the total current acquisition unit 120, and the setting unit 130) of the charger control apparatus 10. The processor 1020 reads each program module onto the memory 1030 and executes the program module, and each function associated with the program module is achieved.

The input/output interface 1050 is an interface for connecting the charger control apparatus 10 and various types of input/output equipment.

The network interface 1060 is an interface for connecting the charger control apparatus 10 to a network. The network is, for example, a local area network (LAN) and a wide area network (WAN). A method of connection to the network by the network interface 1060 may be wireless connection or wired connection. The charger control apparatus 10 may communicate with the charger 20 via the network interface 1060.

Figure 4:
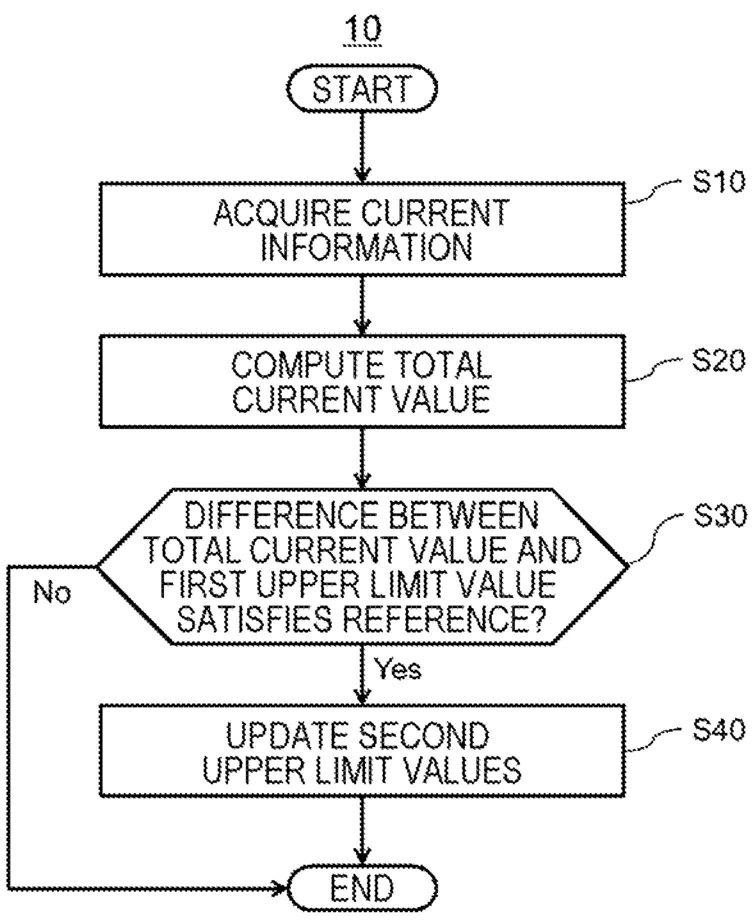
FIG. 4 is a diagram illustrating a first example of processing performed by the charger control apparatus.

FIG. 4 is a diagram illustrating a first example of processing performed by the charger control apparatus 10. As described by using FIG. 2, timing at which the charger control apparatus 10 performs the processing illustrated in FIG. 4 may be on a regular basis, or may be when a new secondary battery is connected to the charger 20 that has not yet started operation.

First, the current information acquisition unit 110 of the charger control apparatus 10 acquires, from each of the plurality of chargers 20, identification information about the charger 20 and current information about the charger 20 (step S10). Next, the total current acquisition unit 120 computes a total value of a current by using the current information acquired in step S10 (step S20).

Then, when the total value acquired by the total current acquisition unit 120 falls below the first upper limit value described above and a difference thereof satisfies a reference (step S30: Yes), the setting unit 130 updates the second upper limit value for each of the plurality of chargers by distributing the difference between the total value and the first upper limit value to the plurality of chargers according to a first rule (step S40).

Figure 5:
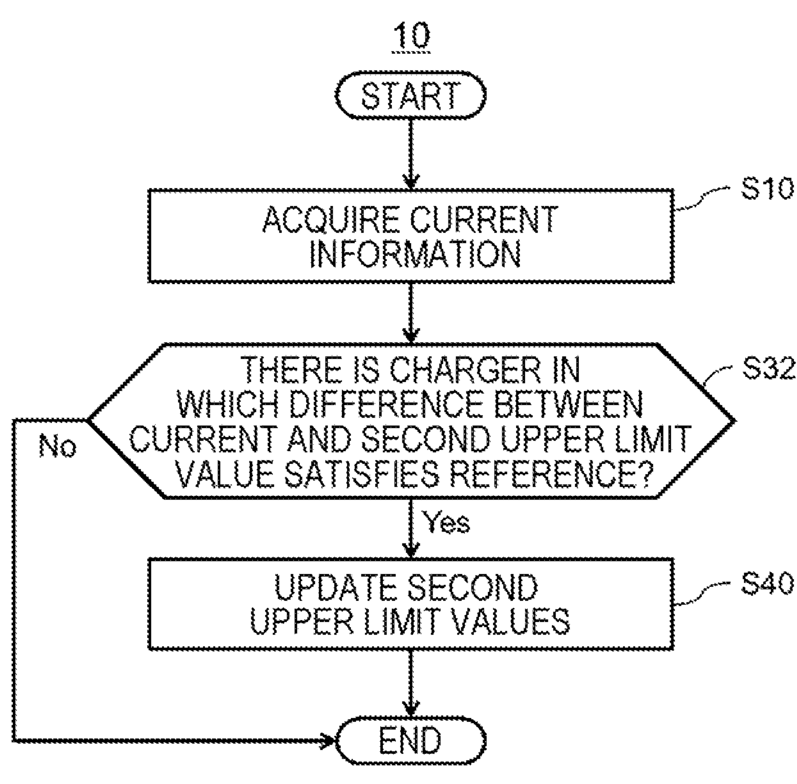
FIG. 5 is a diagram illustrating a second example of processing performed by the charger control apparatus.

FIG. 5 is a diagram illustrating a second example of processing performed by the charger control apparatus 10. Timing at which the charger control apparatus 10 performs the processing illustrated in FIG. 5 is also as described by using FIG. 2.

First, the current information acquisition unit 110 of the charger control apparatus 10 acquires, from each of the plurality of chargers 20, identification information about the charger 20 and current information about the charger 20 (step S10).

Then, the setting unit 130 checks whether there is the charger 20, i.e., the target charger in which a value indicated by the current information is smaller than the second upper limit value and a difference thereof satisfies a reference (step S32). When there is the target charger (step S32: Yes), the setting unit 130 reduces the second upper limit value of the target charger, and also increases the second upper limit value of the other charger 20 by distributing the difference between the second upper limit value of the target charger before and after the update to the other charger 20 according to a second rule (step S40).

FIG. 6 is a diagram for describing the processing performed in step S40 in FIG. 5. In the example illustrated in FIG. 6, the charger control apparatus 10 controls three chargers 20. Then, all the second upper limit value of a current set with respect to the three chargers 20 is "10".

Meanwhile, it is assumed that a current value indicated by current information, i.e., a current value actually flowing through the charger 20 is "10" in the first and third chargers 30, but is "4" in the second charger 20. One of reasons for such a state is that charging of the secondary battery 30 connected to the second charger 20 approaches to the end.

In this case, the setting unit 130 of the charger control apparatus 10 sets the second upper limit value of the second charger 20 to equal to or less than a value indicated by the current information about the second charger 20. In the example illustrated in FIG. 6, the setting unit 130 sets the second upper limit value of the second charger 20 to "4". Then, the setting unit 130 adds a difference ("6" in the example illustrated in FIG. 6) between the second upper limit value before and after the update of the second charger 20 to the second upper limit value of the remaining chargers 20, i.e., the first and third chargers 20, based on the second rule. In the example illustrated in FIG. 6, "6" is distributed, in an equal manner. Thus, the second upper limit value of both the first and third chargers 20 is "13".

Figure 7:
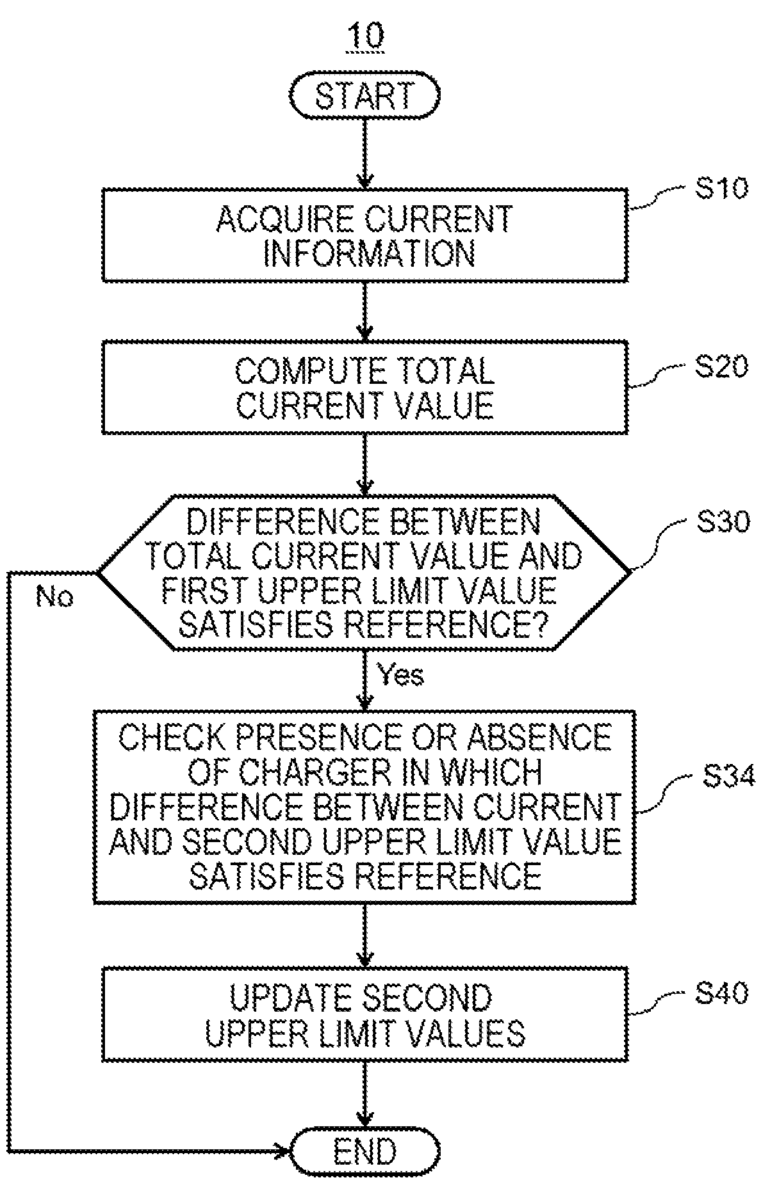
FIG. 7 is a diagram illustrating a third example of processing performed by the charger control apparatus.

FIG. 7 is a diagram illustrating a third example of processing performed by the charger control apparatus 10. Timing at which the charger control apparatus 10 performs the processing illustrated in FIG. 7 is also as described by using FIG. 2. The processing indicated in steps S10 to S30 is as described in FIG. 4.

When the total value acquired by the total current acquisition unit 120 falls below the first upper limit value described above and a difference thereof satisfies a reference (step S30: Yes), the setting unit 130 checks whether there is the charger 20, i.e., the target charger in which a value indicated by the current information is smaller than the second upper limit value and a difference thereof satisfies a reference (step S34).

Then, the setting unit 130 performs update processing of the second upper limit value (step S40). Herein, the setting unit 130 changes the update method of the second upper limit value depending on presence or absence of the target charger. Specifically, when there is no target charger, the setting unit 130 updates the second upper limit value by using the method indicated in step S40 in FIG. 4. On the other hand, when there is the target charger, the setting unit 130 updates the second upper limit value by using the method indicated in step S40 in FIG. 4, and then further updates the second upper limit value by using the method indicated in step S40 in FIG. 5. Note that, in this case, the setting unit 130 may update the second upper limit value by using the method indicated in step S40 in FIG. 5 without updating the second upper limit value by using the method indicated in step S40 in FIG. 4.

Figure 8:
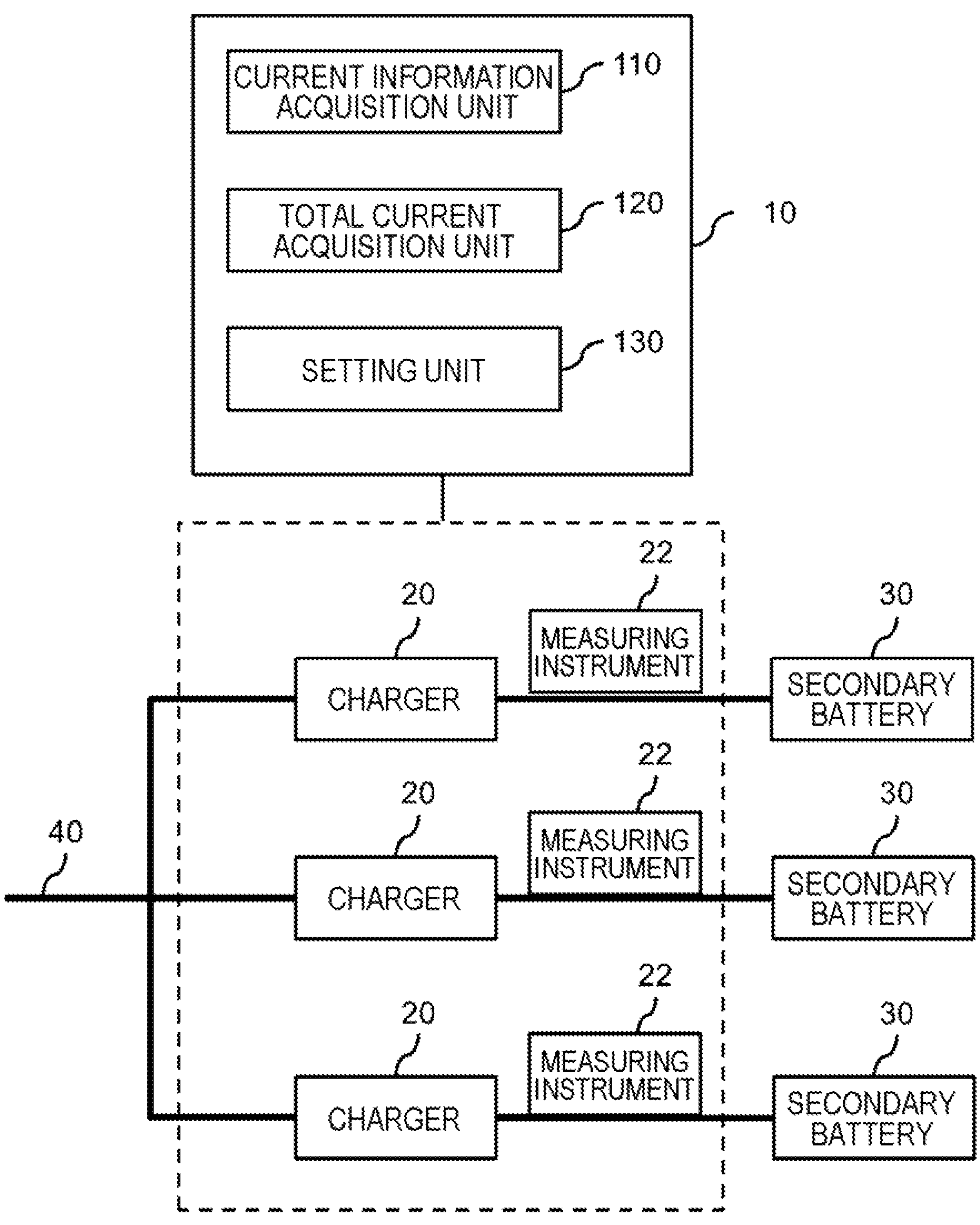
FIG. 8 is a diagram illustrating a first modification example of the usage environment of the charger control apparatus.

FIG. 8 is a diagram illustrating a first modification example of the usage environment of the charger control apparatus 10 illustrated in FIG. 2. The example illustrated in FIG. 8 is similar to the usage environment of the charger control apparatus 10 described by using FIG. 2 except for the following point.

First, a measuring instrument 22 is provided for each of the plurality of chargers 20. The measuring instrument 22 is, for example, a smart meter, and regularly measures information about power flowing through the charger 20, for example, a current value, and transmits the information to the charger control apparatus 10. The charger control apparatus 10 performs the processing described above by using the information received from the measuring instrument 22.

Note that, the measuring instrument 22 may measure a current value flowing between the charger 20 and the secondary battery 30, or may measure a current value flowing through a wiring line that connects the wiring line 40 and the charger 20.

Figure 9:
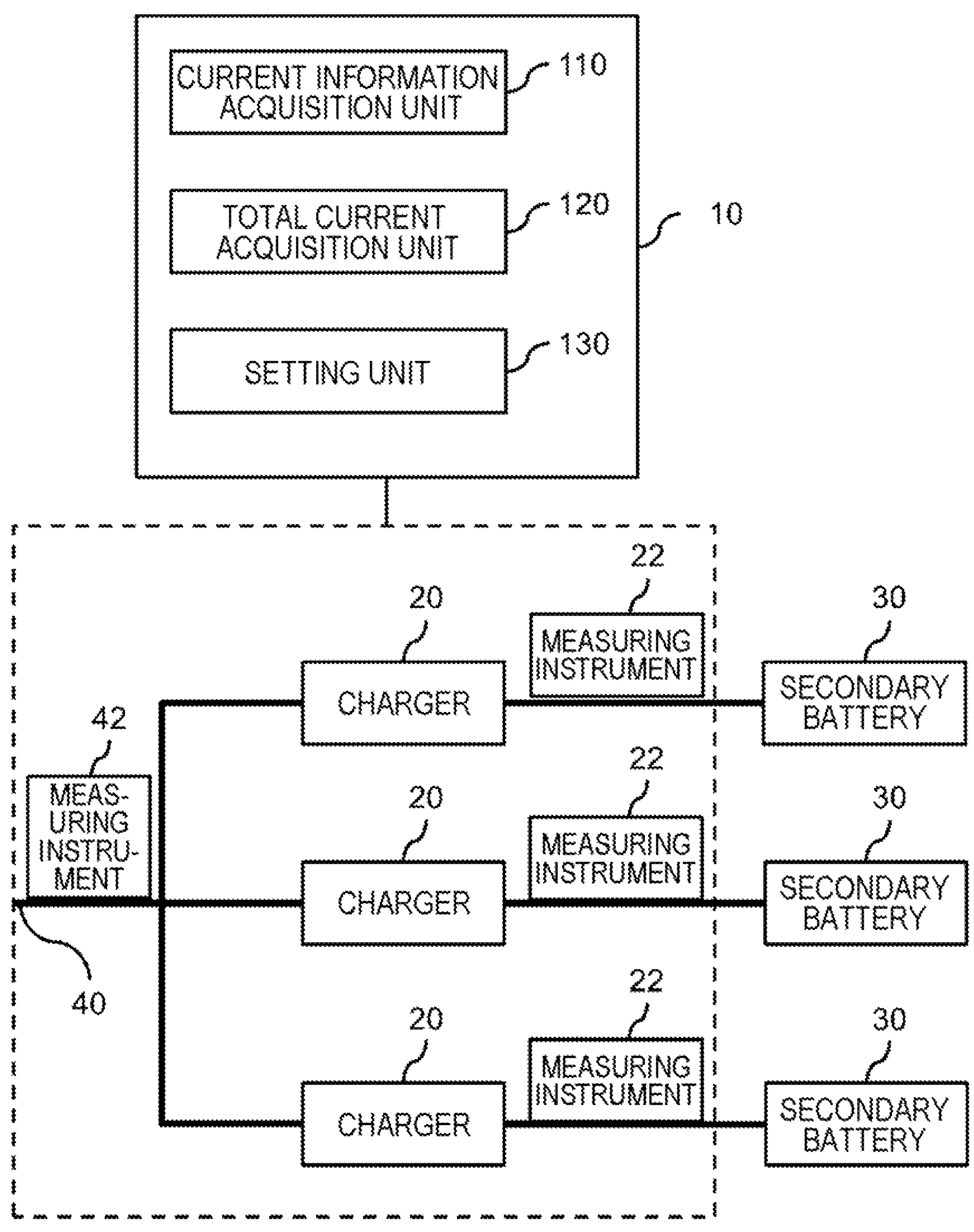
FIG. 9 is a diagram illustrating a second modification example of the usage environment of the charger control apparatus.

FIG. 9 is a diagram illustrating a second modification example of the usage environment of the charger control apparatus 10 illustrated in FIG. 2. The example illustrated in FIG. 9 is similar to the usage environment of the charger control apparatus 10 described by using FIG. 8 except for the following point.

First, a measuring instrument 42 is provided on the wiring line 40. The measuring instrument 42 is, for example, a smart meter, and regularly measures information about power flowing through the wiring line 40, for example, a current value, and transmits the information to the charger control apparatus 10. Then, the total current acquisition unit 120 of the charger control apparatus 10 determines a total value of a current flowing through the plurality of chargers by using the information acquired from the measuring instrument 42. Specifically, the total current acquisition unit 120 sets, as a total value of a current flowing through the plurality of chargers 20, the current value indicated by the information acquired from the measuring instrument 42.

As described above, according to the present example embodiment, when a total value of a current flowing through the plurality of chargers 20 falls below the first upper limit value set with respect to the wiring line 40 and a difference thereof satisfies a reference, the setting unit 130 of the charger control apparatus 10 updates the second upper limit value for each of the plurality of chargers by distributing the difference between the total value and the first upper limit value to the plurality of chargers according to a first rule.

Further, when there is the charger 20, i.e., the target charger in which an actual value of a current value is smaller than the second upper limit value and a difference thereof satisfies a reference, the setting unit 130 reduces the second upper limit value of the target charger, and also updates the second upper limit value of the other charger 20 by distributing the difference between the second upper limit value of the target charger before and after the update to the other charger 20 according to a second rule.

Therefore, when the charger control apparatus 10 is used, a plurality of secondary batteries can be efficiently charged.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, but is not limited thereto.

1. A charger control apparatus including:
   - a total current acquisition unit that acquires a total value of a current flowing through a plurality of chargers connected in parallel with each other; and
   - a setting unit that sets, for each of the plurality of chargers, a second upper limit value being an upper limit value of a current flowing through the charger by using a first upper limit value being an upper limit value of a current being set with respect to a wiring line that supplies a current to the plurality of chargers, in which
   - the setting unit updates a plurality of the second upper limit values by distributing a difference between the total value and the first upper limit value to the plurality of chargers according to a first rule when the difference between the total value and the first upper limit value satisfies a reference.
2. The charger control apparatus according to supplementary note 1 described above, in which
   - the first rule is equal distribution.
3. The charger control apparatus according to supplementary note 1 or 2 described above, further including
   - a current information acquisition unit that acquires, for each of the plurality of chargers, current information indicating magnitude of a current flowing through the charger, in which,
   - when there is the charger in which a value indicated by the current information is smaller than the second upper limit value and a difference thereof satisfies a reference, the setting unit
   - reduces the second upper limit value of the charger, and
   - updates the second upper limit value of another charger by distributing a difference between the second upper limit value of the charger before and after an update to the another charger according to a second rule.
4. The charger control apparatus according to supplementary note 3 described above, in which
   - the second rule is equal distribution.

5. The charger control apparatus according to supplementary note 3 or 4 described above, in which the total current acquisition unit computes the total value by using a plurality of pieces of the current information.

6. The charger control apparatus according to any one of supplementary notes 1 to 5 described above, in which the total current acquisition unit repeatedly acquires the total value, and the setting unit repeatedly updates the plurality of second upper limit values.

7. The charger control apparatus according to any one of supplementary notes 1 to 6 described above, in which when an operation of at least one available charger starts in a state where some of the chargers are available, the setting unit updates the plurality of second upper limit values.

8. The charger control apparatus according to any one of supplementary notes 1 to 7 described above, in which the plurality of chargers charge a secondary battery serving as a power source of an electric vehicle.

9. The charger control apparatus according to any one of supplementary notes 1 to 8 described above, further including the plurality of chargers.

10. A charger control method including, by a computer:

acquiring a total value of a current flowing through a plurality of chargers connected in parallel with each other;

setting, for each of the plurality of chargers, a second upper limit value being an upper limit value of a current flowing through the charger by using a first upper limit value being an upper limit value of a current being set with respect to a wiring line that supplies a current to the plurality of chargers; and updating a plurality of the second upper limit values by distributing a difference between the total value and the first upper limit value to the plurality of chargers according to a first rule when the difference between the total value and the first upper limit value satisfies a reference.

11. The charger control method according to supplementary note 10 described above, in which the first rule is equal distribution.

12. The charger control method according to supplementary note 10 described above, further including, by the computer:

acquiring, for each of the plurality of chargers, current information indicating magnitude of a current flowing through the charger;

when there is the charger in which a value indicated by the current information is smaller than the second upper limit value and a difference thereof satisfies a reference, reducing the second upper limit value of the charger; and updating the second upper limit value of another charger by distributing a difference between the second upper limit value of the charger before and after an update to the another charger according to a second rule.

13. The charger control method according to supplementary note 12 described above, in which the second rule is equal distribution.

14. The charger control method according to supplementary note 12 or 13 described above, further including, by the computer, computing the total value by using a plurality of pieces of the current information.

15. The charger control method according to any one of supplementary notes 10 to 14 described above, further including, by the computer, repeatedly acquiring the total value, and repeatedly updating the plurality of second upper limit values.

16. The charger control method according to any one of supplementary notes 10 to 15 described above, further including, by the computer, when an operation of at least one available charger starts in a state where some of the chargers are available, updating the plurality of second upper limit values.

17. The charger control method according to any one of supplementary notes 10 to 16 described above, in which the plurality of chargers charge a secondary battery serving as a power source of an electric vehicle.

18. A program causing a computer to include:

a total current acquisition function of acquiring a total value of a current flowing through a plurality of chargers connected in parallel with each other; and a setting function of setting, for each of the plurality of chargers, a second upper limit value being an upper limit value of a current flowing through the charger by using a first upper limit value being an upper limit value of a current being set with respect to a wiring line that supplies a current to the plurality of chargers, in which the setting function updates a plurality of the second upper limit values by distributing a difference between the total value and the first upper limit value to the plurality of chargers according to a first rule when the difference between the total value and the first upper limit value satisfies a reference.

19. The program according to supplementary note 18 described above, in which the first rule is equal distribution.

20. The program according to supplementary note 18 or 19 described above further causing the computer to include a current information acquisition function of acquiring, for each of the plurality of chargers, current information indicating magnitude of a current flowing through the charger, in which, when there is the charger in which a value indicated by the current information is smaller than the second upper limit value and a difference thereof satisfies a reference, the setting function reduces the second upper limit value of the charger, and updates the second upper limit value of another charger by distributing a difference between the second upper limit value of the charger before and after an update to the another charger according to a second rule.

21. The program according to supplementary note 20 described above, in which the second rule is equal distribution.

22. The program according to supplementary note 20 or 21 described above, in which the total current acquisition function computes the total value by using a plurality of pieces of the current information.

23. The program according to any one of supplementary notes 18 to 22 described above, in which the total current acquisition function repeatedly acquires the total value, and the setting function repeatedly updates the plurality of second upper limit values.

24. The program according to any one of supplementary notes 18 to 23 described above, in which when an operation of at least one available charger starts in a state where some of the chargers are available, the setting function updates the plurality of second upper limit values.

25. The program according to any one of supplementary notes 18 to 24 described above, in which the plurality of chargers charge a secondary battery serving as a power source of an electric vehicle.

26. A computer-readable storage medium storing the program according to any one of supplementary notes 18 to 25 described above.

It is apparent that the present invention is not limited to the above embodiment, and may be modified and changed without departing from the scope and spirit of the invention.

REFERENCE NUMERALS

10 Charger control apparatus
20 Charger
22 Measuring instrument
30 Secondary battery
40 Wiring line
42 Measuring instrument
110 Current information acquisition unit
120 Total current acquisition unit
130 Setting unit

What is claimed is:

1. A charger control apparatus comprising:

at least one memory configured to store instructions; and at least one processor configured to execute the instructions to perform operations, the operations comprising:

acquiring a total value of a current flowing through a plurality of chargers connected in parallel with each other;

acquiring, for each of the plurality of chargers, current information indicating magnitude of a current flowing through the charger;

setting, for each of the plurality of chargers, a second upper limit value being an upper limit value of a current flowing through the charger by using a first upper limit value being an upper limit value of a current being set with respect to a wiring line that supplies a current to the plurality of chargers; and updating a plurality of the second upper limit values by distributing a difference between the total value and the first upper limit value to the plurality of chargers according to a first rule when the difference between the total value and the first upper limit value satisfies a reference, wherein updating the plurality of the second upper limit values comprises, when there is the charger in which a value indicated by the current information is smaller than the second upper limit value and a difference thereof satisfies a reference, reducing the second upper limit value of the charger, and updating the second upper limit value of another charger by distributing a difference between the second upper limit value of the charger before and after an update to the another charger according to a second rule.

2. The charger control apparatus according to claim 1, wherein the first rule is equal distribution.

3. The charger control apparatus according to claim 1, wherein the second rule is equal distribution.

4. The charger control apparatus according to claim 1, wherein the operations comprise computing the total value by using a plurality of pieces of the current information.

5. The charger control apparatus according to claim 1, wherein the operations comprise repeatedly acquiring the total value, and repeatedly updating the plurality of second upper limit values.

6. The charger control apparatus according to claim 1, wherein the operations comprise, when an operation of at least one available charger starts in a state where some of the chargers are available, updating the plurality of second upper limit values.

7. The charger control apparatus according to claim 1, wherein the plurality of chargers charge a secondary battery serving as a power source of an electric vehicle.

8. The charger control apparatus according to claim 1, further comprising the plurality of chargers.

9. A charger control method comprising, by a computer:

acquiring a total value of a current flowing through a plurality of chargers connected in parallel with each other;

acquiring, for each of the plurality of chargers, current information indicating magnitude of a current flowing through the charger;

setting, for each of the plurality of chargers, a second upper limit value being an upper limit value of a current flowing through the charger by using a first upper limit value being an upper limit value of a current being set with respect to a wiring line that supplies a current to the plurality of chargers; and updating a plurality of the second upper limit values by distributing a difference between the total value and the first upper limit value to the plurality of chargers according to a first rule when the difference between the total value and the first upper limit value satisfies a reference, wherein updating the plurality of the second upper limit values comprises, when there is the charger in which a value indicated by the current information is smaller than the second upper limit value and a difference thereof satisfies a reference, reducing the second upper limit value of the charger, and updating the second upper limit value of another charger by distributing a difference between the second upper limit value of the charger before and after an update to the another charger according to a second rule.

10. A non-transitory computer-readable medium storing a program for causing a computer to perform operations, the operations comprising:

acquiring a total value of a current flowing through a plurality of chargers connected in parallel with each other;

acquiring, for each of the plurality of chargers, current information indicating magnitude of a current flowing through the charger;

setting, for each of the plurality of chargers, a second upper limit value being an upper limit value of a current flowing through the charger by using a first upper limit value being an upper limit value of a current being set with respect to a wiring line that supplies a current to the plurality of chargers; and updating a plurality of the second upper limit values by distributing a difference between the total value and the first upper limit value to the plurality of chargers according to a first rule when the difference between the total value and the first upper limit value satisfies a reference, wherein updating the plurality of the second upper limit values comprises, when there is the charger in which a value indicated by the current information is smaller than the second upper limit value and a difference thereof satisfies a reference, reducing the second upper limit value of the charger, and updating the second upper limit value of another charger by distributing a difference between the second upper limit value of the charger before and after an update to the another charger according to a second rule.

* * * * *